Patented May 20, 1947

2,420,788

UNITED STATES PATENT OFFICE 2,420,788

COMPOUNDING OF RUBBER

Forrest L. McKennon, New Orleans, La., and John Raymond Lindquist, Los Angeles, Calif., assignors to the United States of America, as represented by the Secretary of Agriculture No Drawing. Application June 2, 1945, Serial No. 597,291

9 Claims. (Cl. 260—766)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to soft and tacky rubbers, particularly goldenrod rubber, and has among its objects the provision of a process of solution treatment for such tacky rubbers which will prepare them for compounding prior to vulcanization.

Synthetic and natural rubbers, to be of commercial importance, generally must be sufficiently tough to permit the satisfactory addition of compounding vulcanizing chemicals on conventional mixing rolls or internal type mixers. Goldenrod rubber, however, which is best obtained by solvent extraction of the dried, ground leaf material of the goldenrod plant, is so soft and sticky even after practically complete deresinification, that its handling and compounding, either hot or cold, in conventional mixing equipment, is extremely difficult. Vulcanizates, prepared in the conventional manner by the addition of compounding vulcanizing chemicals to goldenrod rubber on mixing rolls, are low in tensile strengths, fluctuating between about 300 and 1,300 pounds per square inch, and contain scorched spots and air bubbles, thus indicating poor mold flow and poor dispersion of the chemicals in the rubber.

According to the invention, a process is provided which insures good dispersion of part or all of the desired total number of compounding vulcanizing chemicals in the goldenrod rubber, these chemicals, however, being in insufficient quantity to fully compound the rubber, thus causing a toughening, or "precuring" of the stock. In this toughened form, the stock may readily be fully compounded and vulcanized. The process involves dissolving in a mutual solvent, such as benzol, the goldenrod rubber and either all or a part of the desired total number of compounding vulcanizing chemicals which are soluble in the mutual solvent, these chemicals, however, being in insufficient quantity to fully compound the rubber. Complete solution of the materials is then insured by heating the mixture, all of the chemicals necessary for detackifying the rubber and rendering it amenable to subsequent full compounding and vulcanization, being sufficiently soluble in the solvent used to form a clear solution showing no signs of turbidity when used in the amounts and at the temperatures indicated in the examples hereinafter given. The mutual solvent is removed and the resulting partially compounded stock is then subjected to a heat treatment at elevated temperatures, preferably about from 200° to 280° F., until it becomes sufficiently tough. Thereafter, it may be fully compounded and vulcanized in a conventional manner.

By using the procedure described above, partially compounded rubber stock has been prepared that is sufficiently nervy and non-sticky to permit relatively easy complete compounding on mixing rolls. Vulcanizates of this stock have been prepared having tensile strengths ranging about from 2,500 to 3,200 pounds per square inch.

In the application of the invention, all or part of the compounding vulcanizing chemicals soluble in benzol, although in quantity insufficient to fully compound the rubber, is added to a benzol-rubber syrup, and the mixture is heated to insure complete solution. The benzol is then removed, preferably by allowing the mixture to flow into an internal type mixer equipped for vacuum removal of benzol and having steam-heated blades and sides. After removal of the benzol, the material is heated until it has toughened, or "precured" sufficiently to permit handling on mixing rolls so that fillers and reinforcing agents can easily be incorporated.

The following examples are illustrative of the invention:

EXAMPLE I

Approximately 20 pounds of goldenrod rubber containing 3 percent acetone-soluble material, usually called "resins" in rubber terminology, was dissolved in enough benzol to make a syrup sufficiently thin to flow easily. Compounding vulcanizing chemicals dissolved in benzol were added to the benzol-rubber syrup in the respective proportions shown below in Formula No. 1, column 1, and the mixture was heated and allowed to flow into a vacuum-equipped mixer where benzol was removed as rapidly as possible. After removal of the benzol, the temperature was allowed to rise to approximately 250° F., with constant mixing to minimize the amount of "scorching." At this temperature, the mix began to "set up" appreciably. This heat treatment was continued for about an additional 15 minutes, during which time the temperature rose to about 280° F. Exact temperature and time control at this point was not necessary, as only a limited portion of sulfur and accelerators had been used. The precured material was then cooled rapidly and uniformly and discharged from the mixer. Samples of this stock were fully compounded on 4" x 9" mixing rolls by adding the materials shown below in Formula No. 1, column 2.

*Formula No. 1*

| Compounding chemicals | Added in solution (precure), parts | Added on rolls, parts | Final composition, parts |
|---|---|---|---|
| Rubber | 100.0 | | 100.0 |
| Sulfur | 0.6 | 2.9 | 3.5 |
| Mercaptobenzothiazole | 0.75 | 0.25 | 1.0 |
| Diphenylguanidine | 0.3 | 0.5 | 0.8 |
| Zinc stearate | 5.5 | | 5.5 |
| An antioxidant | 0.5 | | 0.5 |
| Resins | 3-7 | | 3-7 |
| Zinc oxide | | 5.5 | 5.5 |
| Carbon black | | 50.0 | 50.0 |

Samples of these fully compounded stocks were then vulcanized and were found to have the following properties:

| Sample No. | Curing time at 260° F., min. | Modulus of elasticity in lbs./sq. in. at elongation of— | | Maximum tensile strength, lbs./sq. in. | Ultimate elongation, Per Cent |
|---|---|---|---|---|---|
| | | 300% | 500% | | |
| 1 | 10 | | | 2,655 | 500 |
| 2 | 20 | 1,520 | 3,085 | 3,125 | 510 |
| 3 | 30 | | | 3,095 | 475 |
| 4 | 40 | | | 3,000 | 435 |

EXAMPLE II

Approximately 100 grams of goldenrod rubber was placed in a glass container and dissolved in a benzol solution containing the chemicals shown below in Formula 2, column 1.

*Formula No. 2*

| Compounding chemicals | Added in solution, parts | Added on rolls, parts |
|---|---|---|
| Rubber | 100.0 | Zinc oxide, 6.0. |
| An antioxidant | 0.5 | Carbon black, 50.0. |
| Sulfur | 3.5 | Diphenylguanidine, 0.5. |
| Stearic acid | 5.0 | |
| Mercaptobenzothiazole | 1.0 | |
| Diphenylguanidine | 0.3 | |

A steam bath was used to distill the benzol from this mixture of rubber and chemicals, and vacuum was applied to lower the temperature and insure good removal of benzol. The resulting partially compounded stock, after removal of benzol, was then heated on a steam bath for about 90 minutes at about 200° F. The rubber at this point was very uniform, but was still soft and sticky. By heating in an oven at about 260° F. for about an additional 30 minutes, it was possible to toughen the stock sufficiently to permit proper handling and full compounding on the rolls with the materials shown in column 2.

EXAMPLE III

The procedure of Example II was slightly modified, Formula No. 3, following, replacing Formula No. 2.

*Formula No. 3*

| Compounding chemicals | Added in solution, parts | Added on rolls, parts |
|---|---|---|
| Rubber | 100.0 | Zinc oxide, 5.5. |
| An antioxidant | 0.5 | Carbon black, 50.0. |
| Sulfur | 3.5 | Diphenylguanidine, 0.5. |
| Zinc stearate | 5.5 | |
| Mercaptobenzothiazole | 1.0 | |
| Diphenylguanidine | 0.3 | |

The main change was the stoichiometrical replacement of stearic acid by zinc stearate in the solution step. After removal of benzol, a heat treatment of only about 30 minutes at about 200° F. was necessary for the preparation of well precured stock. Samples of this stock, which were then vulcanized, exhibited the following physical properties:

| Sample No. | Curing time at 260° F., min. | Modulus of elasticity in lbs./sq. in. at elongation of— | | Maximum tensile strength, lbs./sq. in. | Ultimate elongation, Per Cent |
|---|---|---|---|---|---|
| | | 300% | 500% | | |
| 1 | 10 | 870 | 2,035 | 2,390 | 575 |
| 2 | 20 | 1,245 | 2,430 | 2,590 | 525 |
| 3 | 30 | 1,410 | | 2,390 | 475 |
| 4 | 40 | 1,410 | | 2,360 | 450 |
| 5 | 60 | 1,475 | | 2,295 | 425 |

EXAMPLE IV

The procedure of Example II was modified, Formula No. 4, following, replacing Formula No. 2.

*Formula No. 4*

| Compounding chemicals | Added in solution, parts | Added on rolls, parts |
|---|---|---|
| Rubber | 100.0 | Zinc oxide, 5.8. |
| An antioxidant | 0.5 | Carbon black, 50.0. |
| Sulfur | 3.5 | Diphenylguanidine, 0.5. |
| Zinc mercaptobenzothiazole | 1.2 | |
| Diphenylguanidine | 0.3 | |

The main change was the stoichiometrical replacement of mercaptobenzothiazole by its zinc salt. After removal of benzol, a heat treatment of only about 30 minutes at about 200° F. (as in Example III) was sufficient for the preparation of well precured stock. Samples of this stock, which were then vulcanized, showed the following physical properties:

| Sample No. | Curing time at 260° F., min. | Modulus of elasticity in lbs./sq. in. at elongation of— | | Maximum tensile strength, lbs./sq. in. | Ultimate elongation, Per Cent |
|---|---|---|---|---|---|
| | | 300% | 500% | | |
| 1 | 10 | 335 | 1,065 | 1,870 | 675 |
| 2 | 20 | 565 | 1,530 | 2,340 | 675 |
| 3 | 30 | 700 | 1,800 | 2,470 | 650 |
| 4 | 40 | 800 | 2,000 | 2,535 | 600 |
| 5 | 60 | 1,000 | 2,370 | 2,535 | 550 |

In general, it was found that the solution method greatly enhanced the ease of handling the stock prior to full compounding and vulcanization.

The range of values illustrating the physical properties of the final vulcanizates obtained are shown in the following table:

| Test | Method Tread Stocks | Range of Values |
| --- | --- | --- |
| Maximum tensile strength | Scott | 2,500–3,200 lbs./sq. in. |
| Ultimate elongation | do | 450–600%. |
| Modulus at 500% | do | 2,500–3,000 lbs./sq. in. |
| Hardness | Shore | 60–65. |
| Abrasion | Du Pont | 175–240 cc./H. P. hr. |
| Permanent set | | 20–25%. |
| Specific gravity | | 1.14–1.15. |
| Rebound | Firestone Room T. | 32%. 212° F., 46–55%. |

Having thus described our invention, we claim:

1. A process comprising dissolving in a mutual solvent tacky goldenrod rubber and compounding vulcanizing chemicals, the latter in a quantity insufficient for complete compounding of the goldenrod rubber; removing said solvent; subjecting the resulting partially compounded stock to a temperature of about from 200° to 280° F. until it is sufficiently tough to permit full compounding; then mixing therewith a sufficient quantity of compounding vulcanizing chemicals to fully compound the toughened stock; and finally, heating the fully compounded stock until vulcanization is effected.

2. A process comprising dissolving in benzol tacky goldenrod rubber and compounding vulcanizing chemicals, the latter in a quantity insufficient for complete compounding of the goldenrod rubber; removing the benzol; subjecting the resulting partially compounded stock to a temperature of about from 200° to 280° F. until it is sufficiently tough to permit full compounding; then mixing therewith a sufficient quantity of compounding vulcanizing chemicals to fully compound the toughened stock; and finally, heating the fully compounded stock until vulcanization is effected.

3. A process comprising dissolving in benzol about 100.0 parts of tacky goldenrod rubber to about 0.6 part of sulfur to about 0.75 part of mercaptobenzothiazole to about 0.3 part of diphenylguanidine to about 5.5 parts of zinc stearate and to about 0.5 part of an antioxidant; removing the benzol; subjecting the resulting stock to a temperature of about from 250° to 280° F. until it is sufficiently tough to permit full compounding; then mixing therewith a sufficient quantity of compounding vulcanizing chemicals to fully compound the toughened stock; and finally, heating the fully compounded stock until vulcanization is effected.

4. A process comprising dissolving in benzol about 100.0 parts of tacky goldenrod rubber to about 0.5 part of an antioxidant to about 3.5 parts of sulfur to about 5.0 parts of stearic acid to about 1.0 part of mercaptobenzothiazole and to about 0.3 part of diphenylguanidine; removing the benzol; subjecting the resulting stock to a temperature of at least 260° F. until it is sufficiently tough to permit full compounding; then mixing therewith a sufficient quantity of compounding vulcanizing chemicals to fully compound the toughened stock; and finally, heating the fully compounded stock until vulcanization is effected.

5. A process comprising dissolving in benzol about 100.0 parts of tacky goldenrod rubber to about 0.5 part of an antioxidant to about 3.5 parts of sulfur to about 5.5 parts of zinc stearate to about 1.0 part of mercaptobenzothiazole and to about 0.3 part of diphenylguanidine; removing the benzol; subjecting the resulting stock to a temperature of at least 200° F. until it is sufficiently tough to permit full compounding; then mixing therewith a sufficient quantity of compounding vulcanizing chemicals to fully compound the toughened stock; and finally, heating the fully compounded stock until vulcanization is effected.

6. A process comprising dissolving in benzol about 100.0 parts of tacky goldenrod rubber to about 0.5 part of an antioxidant to about 3.5 parts of sulfur to about 1.2 parts of zinc mercaptobenzothiazole and to about 0.3 part of diphenylguanidine; removing the benzol; subjecting the resulting stock to a temperature of at least 200° F. until it is sufficiently tough to permit full compounding; then mixing therewith a sufficient quantity of vulcanizing compounding chemicals to fully compound the toughened stock; and finally, heating the fully compounded stock until vulcanization is effected.

7. A process of preparing tacky goldenrod rubber for full compounding and vulcanization comprising dissolving in a mutual solvent the goldenrod rubber and compounding vulcanizing chemicals, the latter in a quantity insufficient for complete compounding of the rubber; removing the solvent; and then subjecting the resulting partially compounded stock to a temperature of about from 200° to 280° F. until it is sufficiently tough to permit full compounding and vulcanization.

8. The process of claim 7, wherein the mutual solvent is benzol.

9. A process of preparing tacky goldenrod rubber for full compounding and vulcanization, comprising dissolving in benzol about 100.0 parts of tacky goldenrod rubber to about 0.6 part of sulfur to about 0.75 part of mercaptobenzothiazole to about 0.3 part of diphenylguanidine to about 5.5 parts of zinc stearate and to about 0.5 part of an antioxidant; removing the benzol; and then subjecting the resulting partially compounded stock to a temperature of about from 250° to 280° F. until it is sufficiently tough to permit full compounding and vulcanization.

FORREST L. McKENNON.
JOHN RAYMOND LINDQUIST.

REFERENCES CITED

The following references are of record in the file of this patent:

UNITED STATES PATENTS

| Number | Name | Date |
| --- | --- | --- |
| 1,567,506 | Hopkinson | Dec. 29, 1925 |
| 1,660,213 | Teague | Feb. 21, 1928 |
| 2,082,304 | Stam | June 1, 1937 |
| 2,280,860 | Smyers | Apr. 28, 1942 |
| 2,365,950 | Haefle | Dec. 26, 1944 |